United States Patent
Seo et al.

(10) Patent No.: US 10,322,400 B2
(45) Date of Patent: Jun. 18, 2019

(54) ADSORBENT FOR CAPTURING CARBON DIOXIDE COMPRISING MAGNESIUM OXIDE/TITANIUM DIOXIDE COMPOSITE AND METHOD FOR MANUFACTURING SAME

(71) Applicant: MYONGJI UNIVERSITY INDUSTRY AND ACADEMIA COOPERATION FOUNDATION, Yongin-si, Gyeonggi-do (KR)

(72) Inventors: Jeong Gil Seo, Yongin-si (KR); Vishwanath Hiremath, Yongin-si (KR); Soon Ha Hwang, Paju-si (KR)

(73) Assignee: MYONGJI UNIVERSITY INDUSTRY AND ACADEMIA COOPERATION FOUNDATION, Yongin-si (KR)

( * ) Notice: Subject to any disclaimer, the term of this patent is extended or adjusted under 35 U.S.C. 154(b) by 0 days.

(21) Appl. No.: 15/442,186

(22) Filed: Feb. 24, 2017

(65) Prior Publication Data
US 2017/0354949 A1 Dec. 14, 2017

(30) Foreign Application Priority Data
Jun. 13, 2016 (KR) .................. 10-2016-0072999

(51) Int. Cl.
*B01J 20/04* (2006.01)
*B01D 53/02* (2006.01)
(Continued)

(52) U.S. Cl.
CPC ............ *B01J 20/041* (2013.01); *B01D 53/02* (2013.01); *B01J 20/0211* (2013.01); *B01J 20/06* (2013.01);
(Continued)

(58) Field of Classification Search
CPC ...... B01J 20/041; B01J 53/02; B01J 20/0211; B01J 20/3078; B01J 20/06;
(Continued)

(56) References Cited

FOREIGN PATENT DOCUMENTS

KR 10-2011-0047701 A 5/2011

OTHER PUBLICATIONS

Jeon et al., Graft copolymer templated synthesis of mesoporous MgO/TiO2 mixed oside nanoparticles and their CO2 adsorption capacities, 2012, Physicochem. Eng. Aspects, 414, 75-81.*
(Continued)

*Primary Examiner* — James A Fiorito
(74) *Attorney, Agent, or Firm* — Novick, Kim & Lee, PLLC; Sang Ho Lee (57) ABSTRACT

Provided is an adsorbent for capturing carbon dioxide and a method for manufacturing same, and more particularly, to an adsorbent for capturing carbon dioxide, including a magnesium oxide/titanium dioxide composite having wide surface area, large pore volume and good $CO_2$ adsorption performance, and a method for manufacturing same. According to the present invention, a novel MgO based composite metal oxide which may stably adsorb $CO_2$ at a low temperature such as room temperature is provided. The adsorbent for capturing carbon dioxide, including a magnesium oxide/titanium dioxide composite has good thermal stability, and controls basic sites easily, and is used in various fields for capturing carbon dioxide. In addition, by controlling the molar ratio of the metal ions of the magnesium oxide/titanium dioxide composite and controlling morphology, an adsorbent for capturing carbon dioxide having large surface area and pore volume and strong basic sites may be provided.

7 Claims, 9 Drawing Sheets

(51) Int. Cl.
*B01J 20/02* (2006.01)
*B01J 20/30* (2006.01)
*B01J 20/06* (2006.01)
*B01J 20/28* (2006.01)
*F17C 11/00* (2006.01)

(52) U.S. Cl.
CPC ... *B01J 20/28057* (2013.01); *B01J 20/28069* (2013.01); *B01J 20/3064* (2013.01); *B01J 20/3078* (2013.01); *F17C 11/00* (2013.01); *B01D 2251/402* (2013.01); *B01D 2251/602* (2013.01); *B01D 2253/1124* (2013.01); *B01D 2253/25* (2013.01); *B01D 2253/304* (2013.01); *B01D 2253/306* (2013.01); *B01D 2253/308* (2013.01); *B01D 2253/311* (2013.01); *B01D 2255/2047* (2013.01); *B01D 2255/20707* (2013.01); *B01D 2255/40* (2013.01); *B01D 2255/9202* (2013.01); *B01D 2255/9205* (2013.01); *B01D 2255/9207* (2013.01); *B01D 2257/504* (2013.01); *F17C 2221/013* (2013.01); *Y02C 10/08* (2013.01)

(58) Field of Classification Search
CPC ............ B01J 20/28057; B01J 20/28069; B01J 20/3064; F17C 11/00
See application file for complete search history.

(56) References Cited

OTHER PUBLICATIONS

Lopez et al., Synthesis and characterization of TiO2—MgO mixed oxides prepared by the sol-gel method, 1999, American Chemical Society, 15, 5689-5693.*

Shrestha et al, MgO—TiO2 mixed oxide nanoparticles: Comparison of flame synthesis versus aerogel method; characterization, and photocatalyitic activities, 2012, J. Mater. Res, 3, 431-439.*

Todan et al, Porous nanosized oxide powders in the MgO—TiO2 binary system obtained by sol-gel method, Ceramics International, 40, 15693-15701 (Year: 2014).*

Vishwanath Hiremath et al., "Soft Templating Synthesis and Characterization of TiO2 Stabilized MgO Sorbents for Co2 Capture", The 6th Korea CCS International Conference at Jeju, Republic of Korea (Jan. 27, 2016).

Han Young Lee, Soon Ha Hwang & Jeong Gil Seo. "Carbon dioxide capture using MgO-based absorbent", Catalysis, vol. 32, No. 1, 2016, p. 35-43 (Apr. 1, 2016).

Vishwanath Hiremath et al., "Synthesis and characterization of TiO2 stabilized MgO based sorbents for CO2 capture", The Korean Institue of Chemical Engineers Spring Conference, Bexco, Republic of Korea (Apr. 27, 2016).

* cited by examiner

ADSORBENT FOR CAPTURING CARBON DIOXIDE COMPRISING MAGNESIUM OXIDE/TITANIUM DIOXIDE COMPOSITE AND METHOD FOR MANUFACTURING SAME

STATEMENT REGARDING PRIOR DISCLOSURES BY THE INVENTOR(S)

Let it be known that three non-patent literature references provided in an Information Disclosure Statement submitted herewith the application do not apply as prior art to the present application under AIA 35 U.S.C. § 102(b)(1)(A).

CROSS-REFERENCE TO RELATED APPLICATIONS

This U.S. non-provisional patent application claims priority under 35 U.S.C. § 119 of Korean Patent Application No. 10-2016-0072999, filed on Jun. 13, 2016, the entire contents of which are hereby incorporated by reference.

BACKGROUND OF THE INVENTION

The present invention disclosed herein relates to an adsorbent for capturing carbon dioxide and a method for manufacturing same, and more particularly, to an adsorbent for capturing carbon dioxide, comprising a magnesium oxide/titanium dioxide composite having a wide surface area, a large pore volume and good $CO_2$ adsorption performance, and a method for manufacturing same.

Carbon dioxide ($CO_2$) generated during combustion of fossil fuels is known as the largest source of global warming. A practical alternative on such exhaustion of carbon dioxide approaches to "carbon dioxide capture and sequestration (CCS)" technology by which carbon dioxide can be directly removed from the source of generating carbon dioxide.

Even the success or failure on the developments of the CCS technology depends on successful research and development and proof from particular elemental technology such as capture, compression, transportation and storage of carbon dioxide, since $CO_2$ capture technology takes about 80% of the total CCS processing cost, research and development on the $CO_2$ capture technology are being actively conducted in the developed countries such as America, Europe and Japan.

$CO_2$ absorption by using liquid basic media such as aqueous amines is widely practiced and matured. Contrarily, $CO_2$ adsorption on solid media is being considered as the future technology of the $CO_2$ capture as a more practical and cheap alternative.

Number of candidates for solid media for $CO_2$ adsorption has been considered including zeolites, activated carbons, metal oxides, hydrotalcites, organic-inorganic hybrids, and metal-organic frameworks. In recent years adsorbents based on alkaline metal oxides have gained much attention. With the interest in the temperature window, various alkaline metal oxides have been evaluated, and among these, magnesium oxide (MgO) based metal oxides proves to be the best candidate due to its adequate thermodynamic criteria, wide yet tuneable basicity and basic strength, and feasible temperature window.

However, MgO based adsorbent restricts its large scale application due to lack of its stability under temperature swing operation, slow kinetics, difference in the activity in the bulk and surface, low surface area, and collapse of the activity under multiple adsorption-desorption.

As a consequence, numerous studies were carried out to overcome these drawbacks by developing various MgO based adsorbents including $MgO/Al_2O_3$, $MgO-ZrO_2$, MgO-SBA-15, MgO—C, layered double hydroxides, etc. However, there is lack of investigation with the perspective of the structural features of MgO based inorganic composite and their relationship.

Under such background, the inventors of the present invention developed a novel adsorbent for capturing carbon dioxide using a metal composite oxide of magnesium oxide and titanium dioxide, secured optimal morphology and crystal structure for $CO_2$ adsorption of the metal composite oxide and completed the present invention.

SUMMARY OF THE INVENTION

The present invention provides an adsorbent for capturing carbon dioxide comprising a magnesium oxide/titanium dioxide composite.

The present invention also provides a method for manufacturing an adsorbent for capturing carbon dioxide comprising a magnesium oxide/titanium dioxide composite.

An embodiment of the inventive concept provides an adsorbent for capturing carbon dioxide comprising a magnesium oxide/titanium dioxide composite.

In an embodiment, the magnesium oxide/titanium dioxide composite may have a mesoporous structure.

In an embodiment, the magnesium oxide/titanium dioxide composite may be formed by self-assembly of a metal precursor including a magnesium precursor and a titanium precursor with a soft template.

In an embodiment, the soft template may be a diblock copolymer or a triblock copolymer, and the triblock copolymer may be polyethylene glycol-polypropylene glycol-polyethylene glycol or cetrimonium bromide.

In an embodiment, the magnesium precursor may be magnesium nitrate hexahydrate or magnesium acetate tetrahydrate, and the titanium precursor may be titanium isopropoxide or titanium tetrabutoxide.

In an embodiment, a molar ratio of magnesium/titanium may be greater than 2.0 and less than 5.0, and the molar ratio of magnesium/titanium may preferably be from 3.0 to 4.0

In an embodiment, the magnesium oxide/titanium dioxide composite may have an $MgTi_2O_4$ crystalline phase.

In an embodiment of the inventive concept, a method for manufacturing an adsorbent for capturing carbon dioxide comprises: dissolving a surfactant in a solvent; adding a metal precursor comprising a magnesium precursor and a titanium precursor and an acid in the solvent, and stirring; evaporating the solvent to obtain a self-assembled solid of the metal precursor and the surfactant; and calcining the solid at a temperature of 500° C. or more to remove the surfactant.

In an embodiment, the solvent may be selected from ethanol, methanol, isopropyl alcohol and a combination thereof, and the acid may be selected from nitric acid, acetic acid, hydrochloric acid, sulfuric acid and a combination thereof.

In an embodiment, the magnesium precursor and the titanium precursor may be added so that a molar ratio of magnesium/titanium is greater than 2.0 and less than 5.0.

In an embodiment, the stirring may be performed for 4 to 10 hours, and the calcining may be performed for 4 to 10 hours.

Effects of the Invention

According to the present invention, a novel MgO based composite metal oxide which may stably adsorb $CO_2$ at a low temperature such as room temperature is provided. The adsorbent for capturing carbon dioxide comprising a magnesium oxide/titanium dioxide composite according to the present invention has good thermal stability and the basic sites thereof can be easily controlled, and, thus, may be used for capturing carbon dioxide in various fields.

In addition, an adsorbent for capturing carbon dioxide having large surface area and pore volume and strong basic sites may be provided by controlling the molar ratio of the metal ions and morphology of the magnesium oxide/titanium dioxide composite according to the present invention.

DETAILED DESCRIPTION OF PREFERRED EMBODIMENTS

Hereinafter, preferred embodiments of the present invention will be explained in detail.

The present invention relates to an adsorbent for capturing carbon dioxide comprising a magnesium oxide (MgO)/titanium dioxide ($TiO_2$) composite.

Studies on a magnesium based metal oxide adsorbent for capturing $CO_2$ are being conducted, but structural and morphological studies on an $MgO/TiO_2$ composite for capturing $CO_2$ have not been conducted until now. According to the present invention, the most efficient structure and morphology of an $MgO/TiO_2$ composite for capturing $CO_2$, and a method for manufacturing an adsorbent comprising the composite are provided.

The magnesium oxide/titanium dioxide composite according to the present invention is a composite in which MgO is incorporated into a $TiO_2$ framework. Typically, the insertion of MgO into the $TiO_2$ framework follows the formation of different phases including $MgTiO_3$, $MgTi_2O_4$, $Mg_2TiO_4$ and $MgTi_2O_5$. Among them, the $Mg_2TiO_4$ phase has an inverse spinel structure of $(B^{II})^{tet}(A^{II}B^{II})^{oct}O_4$, and such a structure formed a relatively small amount of Mg—O—Ti base pairs and is somewhat shorts of $CO_2$ capture performance when compared to other phases.

In the present invention, it was found that, by changing the composition ratio of Mg and Ti, an $MgTi_2O_4$ structure having a $(A^{II})^{tet}(B^{III})_2^{oct}O_4$ structure which is a spinel structure similar to $MgAl_2O_4$ can be formed. In addition, Ti possess different oxidation states such as $+2(Mg_2TiO_4)$, $+3(MgTi_2O_4)$ and $+4(MgTiO_3)$, and in the present invention, it was confirmed that Ti having the oxidation state of +3 forms the strongest Mg—O—Ti ion pairs and serves favorable $CO_2$ capture.

In particular, with respect to the insertion of MgO into the $TiO_2$ framework, when the ratio of Mg/Ti is from 0.5 to 2.0, MgO—$TiO_2$ forms an $MgTiO_3$ structure. In addition, when the ratio of Mg/Ti is greater than 2.0 and less than 5.0, MgO—$TiO_2$ forms an MgO—$MgTi_2O_4$ structure, and when the ratio of Mg/Ti is 5.0 or more, MgO—$TiO_2$ forms an MgO—$Mg_2TiO_4$ structure.

In an example of the present invention, it was observed that when the ratio of Mg/Ti was greater than 2.0 and less than 5.0, that is, when forming an $MgTi_2O_4$ structure, $CO_2$ adsorption performance was the best, and the surface area and the pore volume were the greatest. In particular, when the molar ratio of Mg/Ti was from 3.0 to 4.0, particularly good $CO_2$ adsorption performance was attained.

The difference of $CO_2$ adsorption performance depending on the Mg/Ti molar ratio may be explained as follows.

Figure 4:
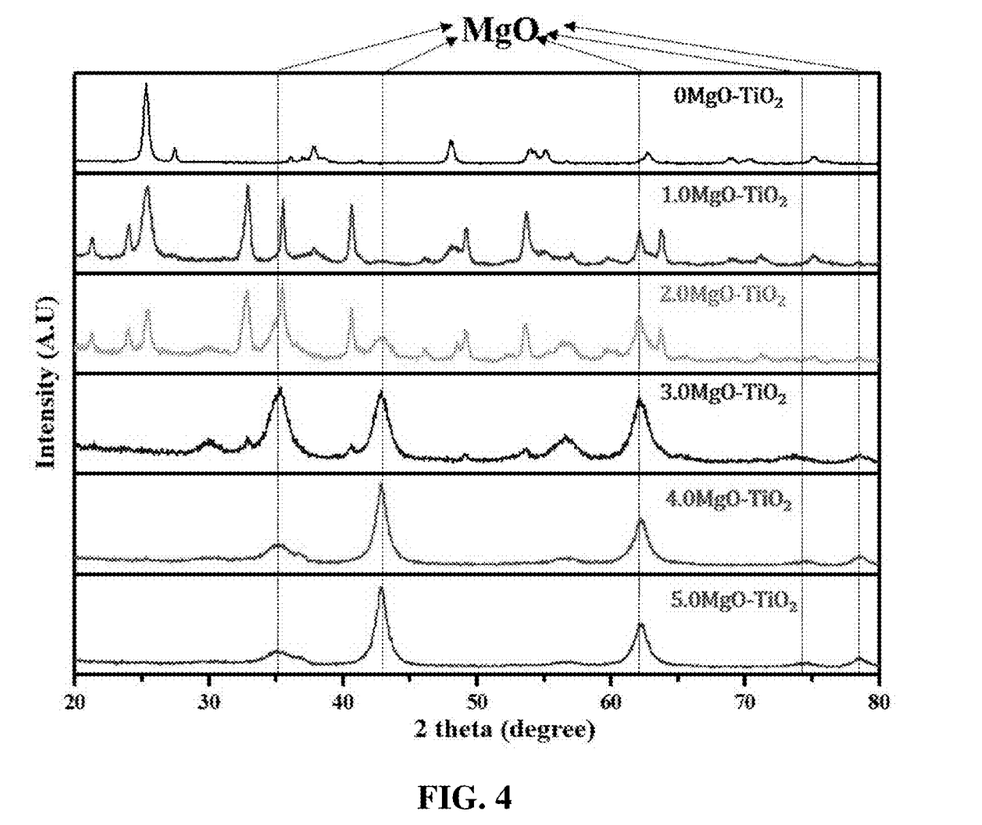
FIG. 4 illustrates analysis results of X-ray diffraction (XRD) patterns of $xMgO-TiO_2$ according to example 1 of the present invention.

As verified in an XRD pattern analysis according to an example of the present invention, an $MgO/TiO_2$ composite shows an $MgTiO_3$ phase until the ratio of Mg/Ti reaches 2. The $MgTiO_3$ crystalline phase has an ilmenite structure ($ABO_3$) composed of AO6 (A=Mg) and BO6 (B=Ti) octahedron and forms weak Mg—O—Ti ion pairs.

Here, when the amount of Mg is increased and the ratio of Mg/Ti is greater than 2.0 and less than 5.0, the crystalline phases of MgO—$TiO_2$, e.g., 3.0MgO—$TiO_2$ and 4.0MgO—$TiO_2$ change $MgTiO_3$ to $MgTi_2O_4$. The $MgTi_2O_4$ crystalline phase with a structure of spindle $AB_2O_4$ contains element B in octahedral sites and A in tetrahedral sites. In addition, Ti has the oxidation state of $Ti^{3+}$ which is the same as $Al^{3+}$ in the $MgAl_2O_4$ spinel structure. This variation in the oxidation states of cationic sites could assist the generation of stronger Mg—O—Ti ion pairs and thus, induces better $CO_2$ adsorption performance than the $MgTiO_3$ crystalline phase.

However, with further increase in the addition of MgO, bulk MgO may be formed, and $CO_2$ adsorption performance may be deteriorated, and in the case where the ratio of Mg/Ti is 5 or more, the phase changes to $Mg_2TiO_4$ crystalline phase. Since the $Mg_2TiO_4$ crystalline phase has an inverse spinel structure as described above, somewhat insufficient $CO_2$ capture performance may be attained when compared to $MgTi_2O_4$ having a spinel structure.

Accordingly, in the present invention, by setting the molar ratio of Mg/Ti to greater than 2.0 and less than 5.0, a composite oxide adsorbent having an $MgTi_2O_4$ crystalline phase which is the most appropriate crystalline structure for the $CO_2$ adsorption may be obtained.

Further, in an example of the present invention, it was confirmed through experiments that an adsorbent having the molar ratio of Mg/Ti of greater than 2.0 and less than 5.0 exhibited the best $CO_2$ adsorption performance, and particularly, it was confirmed that an adsorbent having the molar ratio of Mg/Ti from 3.0 to 4.0 exhibited particularly good $CO_2$ adsorption performance.

The adsorbent for capturing carbon dioxide comprising a magnesium oxide/titanium dioxide composite according to the present invention showed good $CO_2$ adsorption performance at room temperature such as 25° C., and not inferior $CO_2$ adsorption performance at a high temperature of 200° C. when compared to other well-known MgO based metal composites in literatures, and may be used for $CO_2$ adsorption in various fields.

The magnesium oxide/titanium dioxide composite according to the present invention is formed by the self-assembly of a metal precursor including a magnesium precursor and a titanium precursor with a soft template which is a surfactant, and has a mesoporous structure.

In the present invention, the term "mesoporous" means a material containing pores having a diameter of mainly 2 to 50 nm.

In this aspect, the adsorbent for capturing carbon dioxide according to the present invention may be manufactured by dissolving a surfactant in a solvent; adding a metal precursor comprising a magnesium precursor and a titanium precursor and an acid in the solvent, and stirring; evaporating the solvent to obtain a self-assembled solid of the metal precursor and the surfactant; and calcining the solid at a temperature of 500° C. or more to remove the surfactant.

In the present invention, the solvent may be selected from ethanol, methanol, isopropyl alcohol and a combination thereof, and absolute ethanol is the most preferable.

In the present invention, the surfactant is preferably a soft template to obtain an ordered mesoporous composite metal oxide. The soft template may be a diblock or triblock copolymer, and the triblock copolymer is preferably used. The triblock copolymer used in the present invention may include polyethylene glycol-polypropylene glycol-polyethylene glycol (PEG-PPG-PEG), cetrimonium bromide, etc. More particularly, $HO(CH_2CH_2O)_{20}(CH_2CH(CH_3)O)_{70}(CH_2CH_2O)_{20}H$ or $HO(CH_2CH_2O)_{100}-(CH_2(CH_3)CHO)_{65}-(CH_2CH_2O)_{100}$ may be used.

Figure 1:
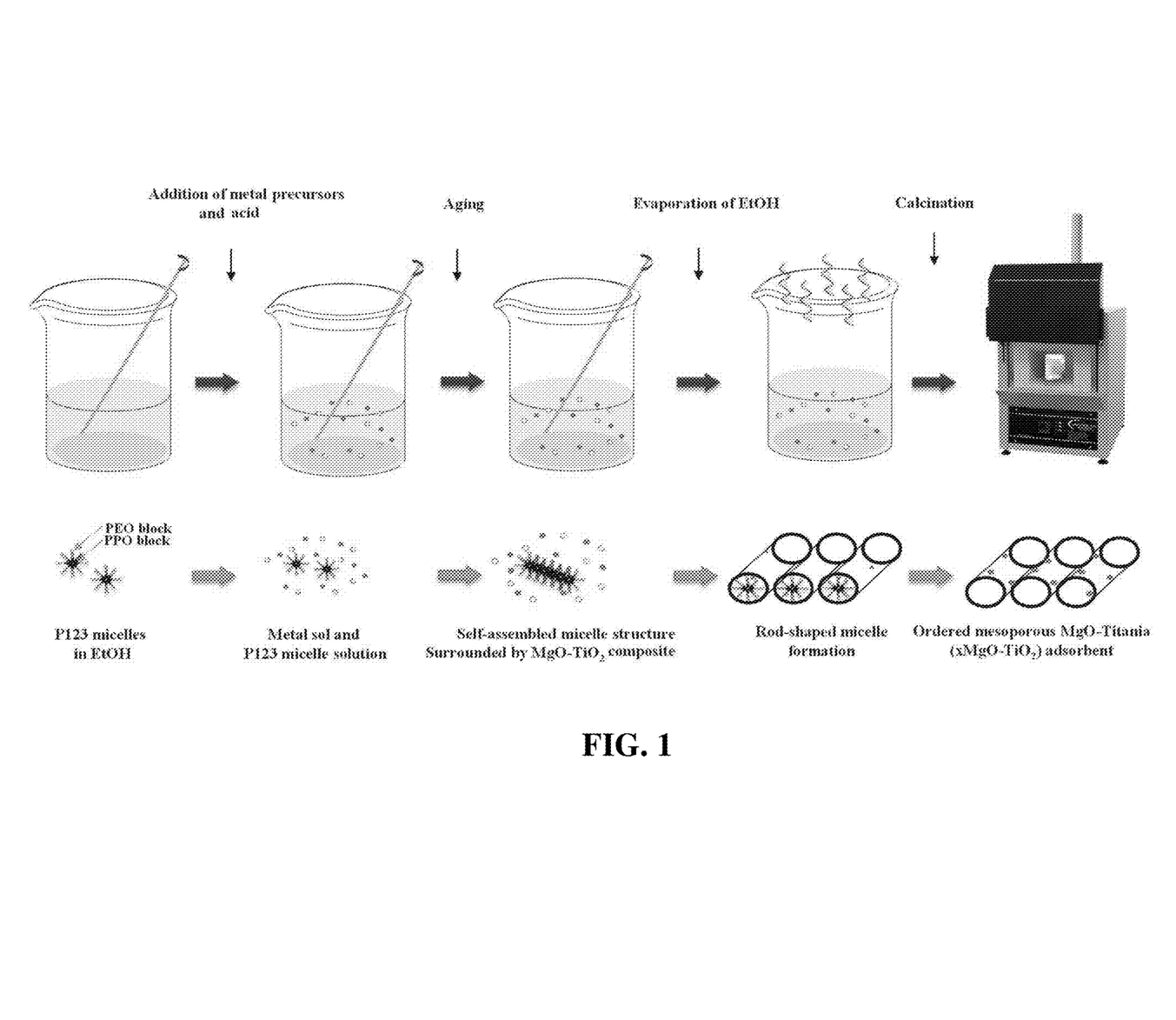
FIG. 1 illustrates a manufacturing process of an adsorbent for capturing carbon dioxide comprising a magnesium oxide/titanium dioxide composite according to an embodiment of the present invention.

Hereinafter, the manufacturing process of the mesoporous composite metal oxide adsorbent of the present invention will be explained in detail referring to FIG. 1.

In the first step, a surfactant is dissolved in a solvent. When PEG-PPG-PEG triblock copolymer is used as a soft template surfactant, the surfactant may be dissolved in the solvent and present as a form of micelle. Then, a metal oxide and an acid are added thereto and stirred to form a cylindrical self-assembled micelle structure of PEG-PPG-PEG, and the metal oxide is positioned around the cylindrical micelles. After that, the solvent is evaporated to obtain a solid state in which the metal oxide is incorporated into the cylindrical PEG-PPG-PEG micelles. The solid is calcined at 500° C. or more to remove PEG-PPG-PEG, and a composite metal oxide adsorbent which maintains the shape of the template is formed. In this case, the composite metal oxide adsorbent has a cylindrically ordered mesoporous structure.

In the present invention, the magnesium precursor may comprise magnesium nitrate hexahydrate, magnesium acetate tetrahydrate, etc., and the magnesium nitrate hexahydrate is the most preferable.

In the present invention, the titanium precursor may comprise titanium isopropoxide or titanium tetrabutoxide, and the titanium isopropoxide is the most preferably used.

In the present invention, the self-assembly of a metal precursor and a soft template may preferably be conducted under acidic conditions, and an acid is preferably added together with the metal precursor. The acid may preferably be nitric acid, acetic acid, hydrochloric acid, sulfuric acid or a combination thereof, and the amount thereof may preferably be controlled to adjust pH to 4.0 to 6.0.

In the method of the present invention, the stirring may preferably be performed for a sufficient time period so that the metal precursor and the soft template may be sufficiently self-assembled. In an embodiment of the present invention, the stirring may preferably be performed for 4 to 10 hours.

In the present invention, the evaporation of the solvent may be performed using an appropriate well-known method depending on the kind of the solvent. For example, the evaporation of ethanol may preferably be performed at 50 to 70° C. for 24 to 72 hours. After completing the evaporation of the solvent, a self-assembled solid phase of the metal precursor and the soft template may be obtained.

The solid phase thus obtained may be calcined at 500° C. or higher to remove the surfactant, physico-chemically adsorbed water, impurities including volatile compounds, etc. The calcining is preferably performed for 4 to 10 hours to sufficiently remove the surfactant and the impurities. In an example of the present invention, it was confirmed that a magnesium oxide/titanium dioxide composite having high crystallinity without remaining impurities or residues may be obtained when performing calcination under the conditions of 500° C. or higher.

As described above, since the magnesium oxide/titanium dioxide composite formed by the self-assembly of a metal precursor and a soft template has a certain morphology, good $CO_2$ capture performance may be exhibited when compared to a magnesium oxide/titanium dioxide composite having the same crystalline phase. However, an adsorbent for capturing carbon dioxide, having good stability and good $CO_2$ adsorption performance may be provided even synthesizing a magnesium oxide/titanium dioxide composite not by the above-described method but by another method. Such embodiments are also included in the scope of the present invention. In addition, by setting the molar ratio of Mg/Ti of such magnesium oxide/titanium dioxide composite to 3 to 4, optimized $CO_2$ adsorption performance may be attained. For example, in another embodiment of the present invention, $MgO-TiO_2$ nanoparticles may be obtained using a precipitating agent such as $NH_4OH$.

Hereinafter, the present invention will be described below in more detail with reference to particular embodiments. In the embodiments, experimental methods and components are partially explained to illustratively explain the present invention. However, the scope of the present invention is not limited to the embodiments.

Example 1: Synthesis of $xMgO-TiO_2$ Adsorbent 2.3 g of $HO(CH_2CH_2O)_{20}(CH_2CH(CH_3)O)_{70}(CH_2CH_2O)_{20}H$ (Pluronic $P_{123}$; Sigma Aldrich) was added as a triblock copolymer of a soft template to 50 ml of absolute ethanol (94.5%, Samchun Chemical Co.) and dissolved for 4 hours. Then, 5 g of titanium isopropoxide $(Ti[OCH(CH_3)_2]_4, \geq 97\%$, Sigma Aldrich) was dissolved therein, and 5 ml of nitric acid (70%) was added thereto. After stirring and a clear solution was obtained, magnesium nitrate hexahydrate $(Mg(NO_3)_2 \cdot 6H_2O)$ (99%, ACS reagent) was added so that the ratio of Mg/Ti became 0, 1, 2, 3, 4 and 5, respectively; followed by stirring for 5 hours. Then, the solution thus obtained was evaporated at 60° C. for 48 hours to induce the self-assembly of the metal precursor. The solid obtained after evaporating the solvent was calcined at 550°

C. for 5 hours to obtain an ordered mesoporous adsorbent, xMgO-TiO$_2$ (x=0, 1, 2, 3, 4 and 5).

Example 2: Synthesis of 3MgO—TiO$_2$ Using NH$_4$OH Precipitating Agent

A 3MgO—TiO$_2$ composite metal oxide was synthesized using NH$_4$OH as a precipitating agent. 5 g of titanium isopropoxide (≥97%, Sigma Aldrich) was added to 50 ml of an ethanol solution, and magnesium nitrate hexahydrate (99%, ACS reagent) was added so that the molar ratio of Mg/Ti was 3:1. Then, water was added to complete hydrolysis, and NH$_4$OH was added as a precipitating agent. In this case, water and NH$_4$OH were added so that the molar ratio of ethanol:water:NH$_4$OH was 85:5:0.04. After that, the solution was stirred for 5 hours, and the solvent was evaporated at 60° C. for 48 hours. The solid thus obtained was calcined at 550° C. for 5 hours to finally obtain 3MgO—TiO$_2$ nanoparticles as an adsorbent.

Analysis of Thermostability

Figure 2:
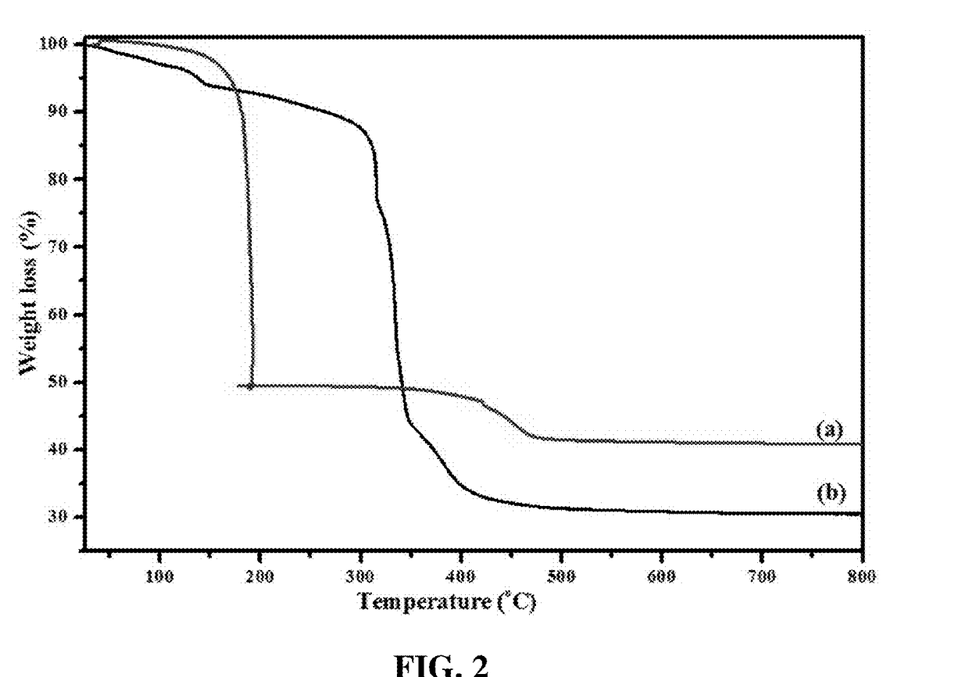
FIG. 2 illustrates thermogravimetric analysis results of $3MgO-TiO_2$ adsorbents according to example 1 and example 2 of the present invention.

3MgO—TiO$_2$ manufactured in each of example 1 and example 2 was heated in the atmosphere and thermogravimetric analysis (TGA) was performed. The results are shown in FIG. 2. As shown in FIG. 2, the thermal decomposition of both samples was completed at about 500° C. The TGA was performed at a heating rate of 5° C./min.

3MgO—TiO$_2$ synthesized in example 1 exhibited three major weight loss regions in different temperature ranges. The first region of weight loss, observed 25-150° C., typically assigned to the removal of the surface adsorbed species such as physically adsorbed water and volatile compounds. The second region which is the major weight loss, 150-250° C. is attributed to the decomposition of PEG units of surfactant P$_{123}$. The third step was the weight loss in a range of 400-500° C., which was attributed to the dihydroxylation of M(Mg, Ti)-hydroxides and chemically adsorbed water, and to the complete conversion into perfect phases.

From such TGA, it was found that the magnesium oxide/titanium dioxide composite according to the present invention might completely form a composite structure at a relatively low temperature range of less than 550° C., and xMgO-TiO$_2$ having high crystallinity might be grown by setting an appropriate calcination temperature.

In the case of the 3MgO—TiO$_2$ nanoparticles synthesized in example 2, the mass loss took place stepwise assigned to water, structural hydroxyl groups and organic residues elimination, and the stabilization was also attained at about 500° C.

Figure 3A:
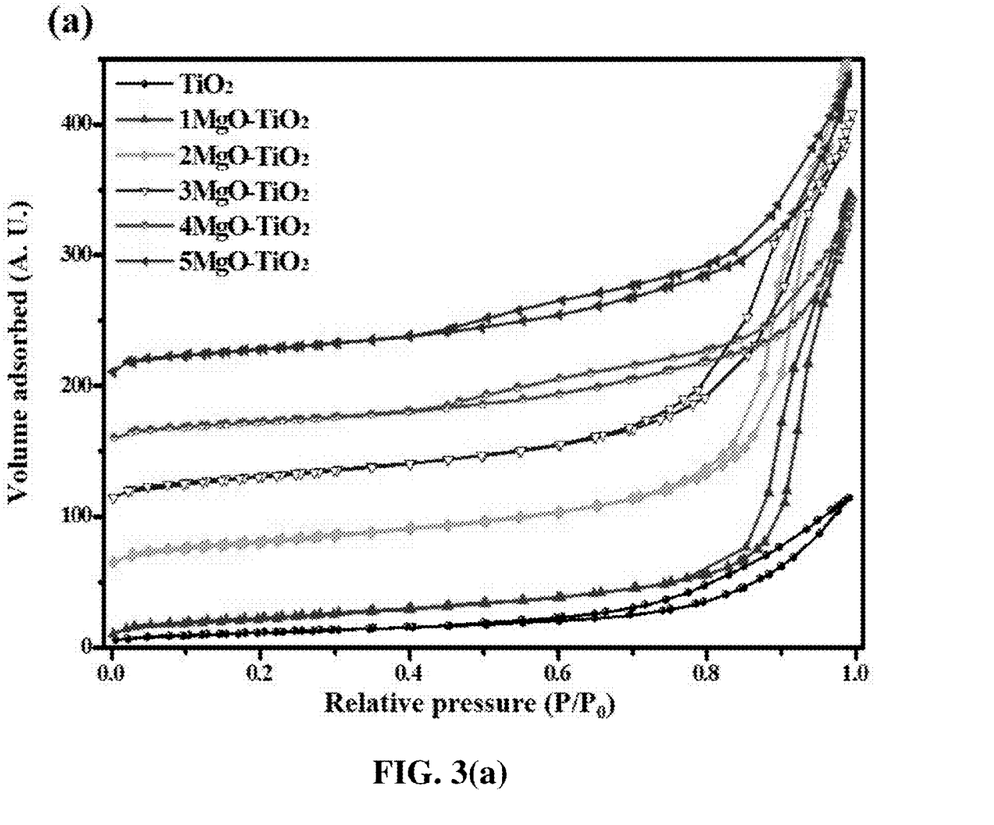
FIG. 3(a) is $N_2$ adsorption-desorption isotherm curves of $xMgO-TiO_2$ according to example 1 of the present invention.
Figure 3B:
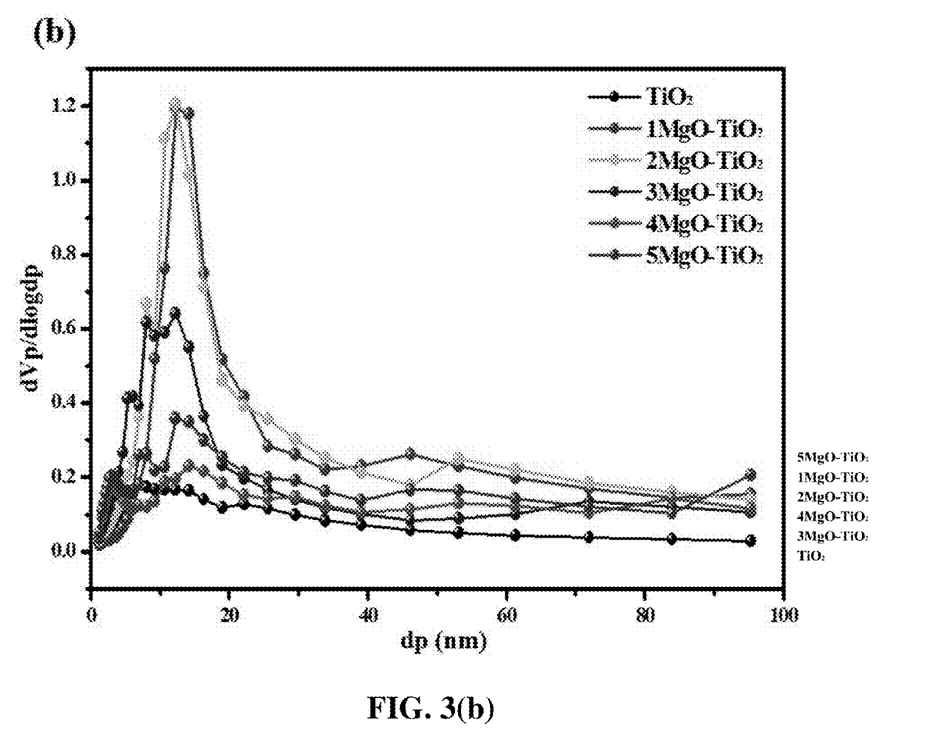
FIG. 3(b) is pore size distribution curves of $xMgO-TiO_2$ according to example 1 of the present invention.

Analysis of Surface Characteristics xMgO-TiO$_2$ (x=0, 1, 2, 3, 4 and 5) synthesized in example 1 were analyzed by an N$_2$ adsorption-desorption analysis at 298K using BELSORP-mini (BEL Japan Inc.), and the analysis results are shown in FIG. 3. FIG. 3(a) illustrates N$_2$ adsorption-desorption isotherms, and FIG. 3(b) illustrates pore size distribution (PSD) curves.

In FIG. 3(a), all samples show a Type-IV adsorption isotherms and H1-type hysteresis loop, and from the results, it may be confirmed that the samples had a mesoporous structure.

The textural properties of the samples such as a specific surface area, a pore volume and a pore diameter were analyzed, and the results are shown in the table 1 below. The specific surface area was calculated by the BET method, the pore volume was obtained at a relative pressure (p/p$_0$) of 0.99 in FIG. 3(a), and an average pore diameter was calculated from the adsorption branch of N$_2$ isotherm by the BJH method. In addition, with respect to the samples synthesized in example 2, the specific surface area, the pore volume and the pore diameter were analyzed by the same method, and the results are shown together in table 1.

TABLE 1

| xMgO—TiO$_2$ | Specific surface area (m$^2$/g) | Pore diameter (nm) | Pore volume (cm$^3$/g) |
| --- | --- | --- | --- |
| 0MgO—TiO$_2$ | 41.0 | 17.16 | 0.17 |
| 1MgO—TiO$_2$ | 80.6 | 26.52 | 0.53 |
| 2MgO—TiO$_2$ | 113.3 | 21.98 | 0.62 |
| 3MgO—TiO$_2$ | 111.4 | 16.44 | 0.45 |
| 4MgO—TiO$_2$ | 100.6 | 14.52 | 0.36 |
| 5MgO—TiO$_2$ | 79.9 | 13.63 | 0.27 |
| 3MgO—TiO$_2$ (NH$_4$OH) | 63.4 | 8.65 | 0.13 |

As confirmed in the above table 1, the specific surface area, the pore diameter and the pore volume increased with the increase of the molar ratio of Mg/Ti, but the specific surface area, the pore diameter and the pore volume decreased when the molar ratio of Mg/Ti was greater than 2. Among the adsorbents having the MgO—MgTi$_2$O$_4$ crystalline structure, 3MgO—TiO$_2$ had the greatest specific surface area, pore diameter and pore volume.

In addition, 3MgO—TiO$_2$ synthesized using NH$_4$OH as a precipitating agent had the same composition ratio and crystalline phase as those of the 3MgO—TiO$_2$ adsorbent having a mesoporous structure using a soft template, but had relatively small specific surface area, pore diameter and volume due to the structural difference.

Analysis of XRD Patterns

In order to analyze the XRD patterns of xMgO-TiO$_2$ samples synthesize in example 1, XRD patterns were measured using XRD (D-Max2500-PC, Rigaku) with 2θ value of 20 to 80. The measured results are shown in FIG. 4.

In FIG. 4, the pristine TiO$_2$ in which Mg was not incorporated, possessed pure anatase phase as identified by ICDD file no. 01-078-2468. With further introduction of MgO in the TiO$_2$ lattice has shown the phase transformation as shown in the table below.

TABLE 2

| Mg/Ti | ICDD file no. | Phase |
| --- | --- | --- |
| 0 | 01-0787-2468 | Anatase |
| 1 | 01-079-0831 | MgTiO$_3$ |
| 2 | 01-079-0831 | MgTiO$_3$ |
| 3 | 01-074-2258 | MgTi$_2$O$_4$ |
| 4 | 01-074-2258 | MgTi$_2$O$_4$ |
| 5 | 01-079-0829 | Mg$_2$TiO$_4$ |

As shown in the above table, the molar ratio of Mg/Ti was found to have a strong influence to the crystal structure of a composite. Specifically, with the increase of the molar ratio of Mg/Ti, the crystal phase was transformed as the following order: MgTiO$_3$→MgO—MgTi$_2$O$_4$→MgO—Mg$_2$TiO$_4$.

Analysis of FE-TEM/FE-SEM Images

FE-SEM images of the 3MgO—TiO$_2$ samples manufactured in example 1 were obtained by Helios 650 scanning electron microscope using an acceleration voltage of 15 kV. Prior to imaging the samples were sputter-coated with platinum coating. In addition, FE-TEM (Tecnai F20, FEI) analysis was carried out to examine the mesopore characteristics of the samples. Simultaneously, an energy dispersion spectroscopy (EDS)-elemental mapping was carried out in order to see the distribution of Mg, Ti and O throughout the composite and to assure the elemental compositions.

Figure 5:
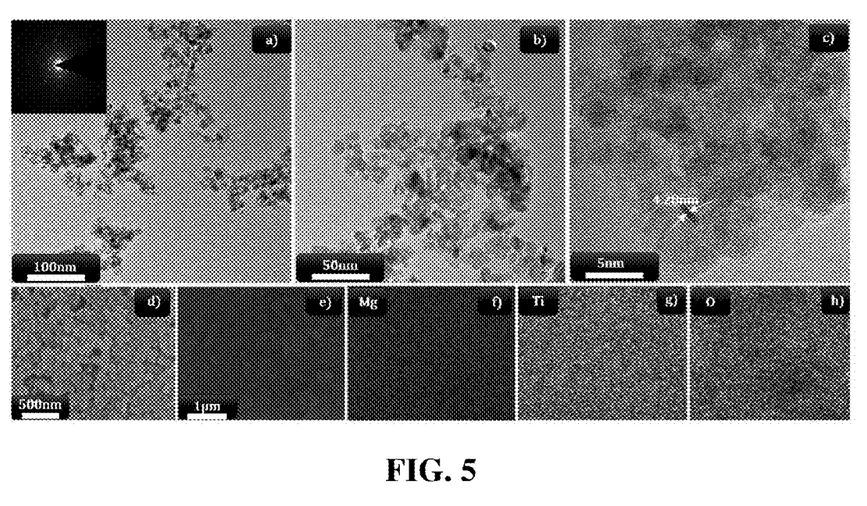
FIG. 5 show images wherein (a) to (c) are field emission transmission electron microscope (FE-TEM) images of $3MgO-TiO_2$ according to example 1 of the present invention; (d) is an field emission scanning electron microscope (FE-SEM) image of $3MgO-TiO_2$ according to example 1 of the present invention; and (e) to (h) are energy dispersive spectroscopy (EDS)-elemental mapping images of $3MgO-TiO_2$ according to example 1 of the present invention.

As confirmed from FIGS. 5(a) to 5(c), the TEM images of the samples showed the morphology of random stacking of spherical nanoparticles uniformly distributed with an average diameter of 10 nm or less dispersed throughout the sample. From FIG. 5(c), it was found that mesopores were evenly dispersed. In addition, the FE-SEM image of FIG. 5(d) showed the uniformly distributed particles stacked in irregular fashion. FIGS. 5(e) to 5(h) showed EDS-elemental mapping results, indicating the homogeneous distribution of the active metal species (Mg, Ti, O).

Analysis of $CO_2$ Adsorption Performance $CO_2$ adsorption-desorption experiments were conducted using a thermogravimetric analyzer (SCINCO, TGA N-1000), which includes both physisorbed and chemisorbed $CO_2$.

Figure 6A:
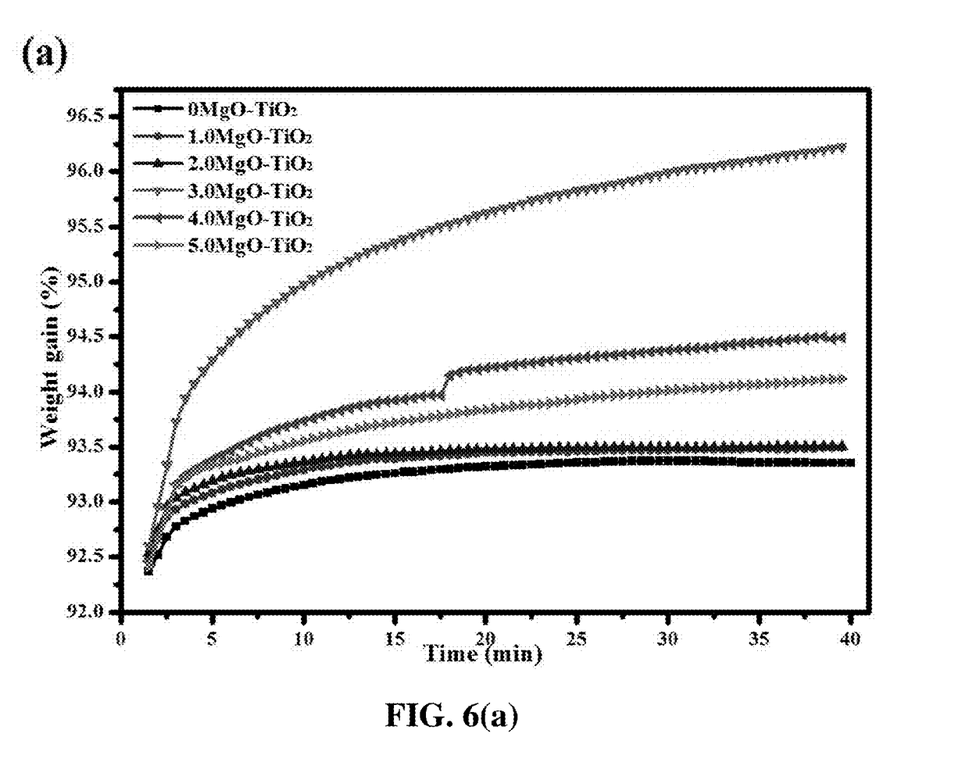
FIG. 6(a) illustrates $CO_2$ adsorption curves at 25° C. of $xMgO-TiO_2$ according to example 1 of the present invention.

20 mg of each adsorbent manufactured in example 1 and example 2 was placed in a platinum pan, and the adsorbent was pretreated at 200° C. for 30 min with a flow of $N_2$ (60 ml/min). After cooling to the adsorption temperature (25° C.), the pure $CO_2$ was introduced at a flow rate of 100 ml/min. Weight change due to the adsorption was then calculated in terms of mmol/g. The results thus obtained are shown in FIG. 6.

s confirmed in FIG. 6(a), the $CO_2$ adsorption performance of the samples was increased with the increase of the molar ratio of Mg/Ti, and the best $CO_2$ adsorption performance was attained at Mg/Ti=3. Then, the $CO_2$ adsorption performance was decreased with the additional increase of the molar ratio of Mg/Ti. In addition, it may be confirmed that with respect to the $3MgO$—$TiO_2$ crystal having the same molar ratio of Mg/Ti of 3, an adsorbent manufactured using an $NH_4OH$ precipitating agent showed about half of the $CO_2$ adsorption performance when compared to that of an adsorbent manufactured by the self-assembly of a soft template.

Figure 7:
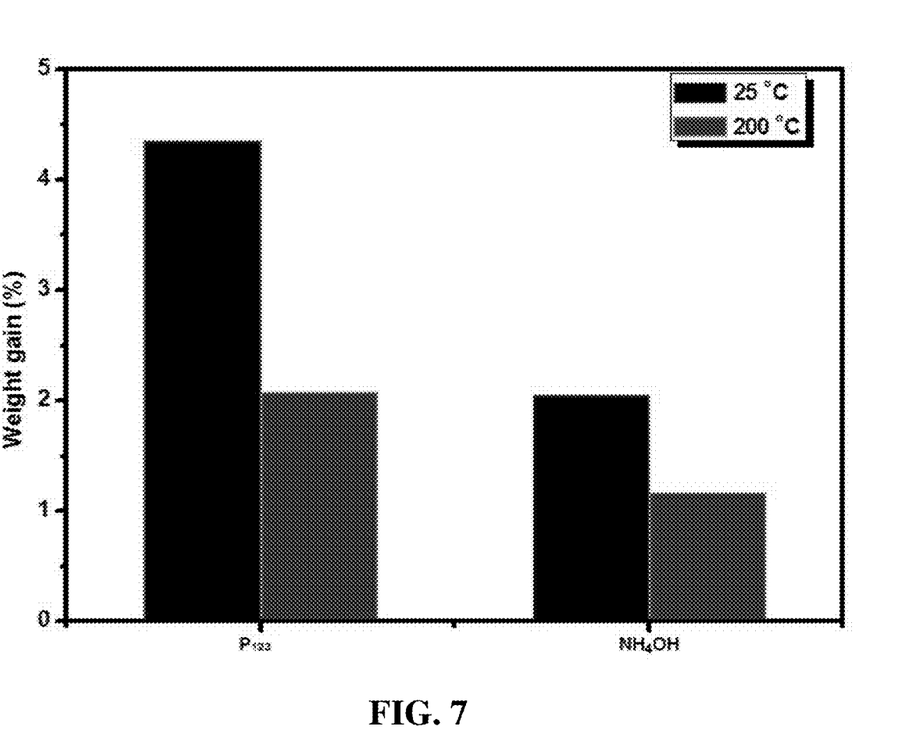
FIG. 7 illustrates $CO_2$ adsorption performance at 25° C. and 200° C. of $3MgO-TiO_2$ according to example 1 and example 2 of the present invention.

In order to confirm the influence according to the temperature, the $CO_2$ adsorption performance was measured at 200° C. for $3MgO$—$TiO_2$ of example 1 and $3MgO$—$TiO_2$ of example 2, and the results were compared with those measured at 25° C. and are shown in FIG. 7. The measured results of the $CO_2$ adsorption performance at 200° C. were confirmed to have about half of the $CO_2$ adsorption performance measured at 25° C. for both samples of example 1 and example 2.

Figure 6B:
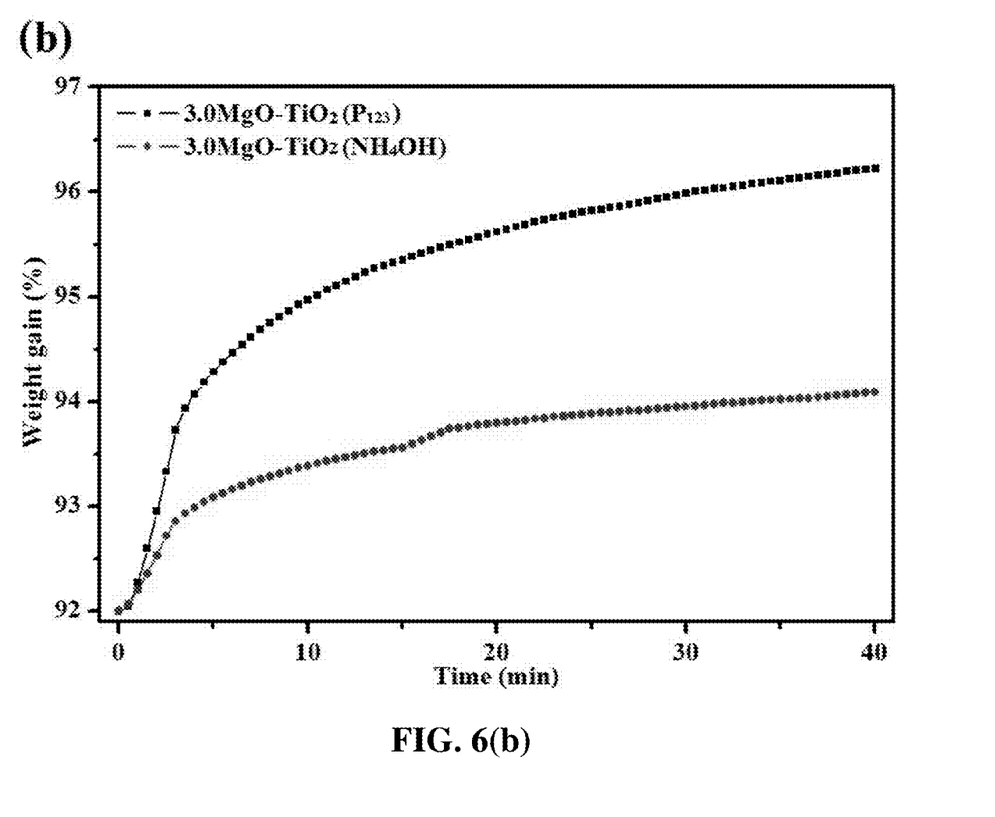
FIG. 6(b) illustrates $CO_2$ adsorption curves at 25° C. of $3MgO-TiO_2$ according to example 1 and example 2 of the present invention.

The results of FIGS. 6 and 7 are summarized and shown in table 3 below.

TABLE 3

| $xMgO$—$TiO_2$ | $CO_2$ adsorption performance (25° C., wt %) | $CO_2$ adsorption performance (200° C., wt %) |
|---|---|---|
| $1MgO$—$TiO_2$ | 1.5 | — |
| $2MgO$—$TiO_2$ | 1.5 | — |
| $3MgO$—$TiO_2$ | 4.39 | 2.07 |
| $4MgO$—$TiO_2$ | 2.6 | — |
| $5MgO$—$TiO_2$ | 2.1 | — |
| $3MgO$—$TiO_2$ ($NH_4OH$) | 2.05 | 1.16 |

In particular, $3.0MgO$—$TiO_2$ according to example 1 showed the $CO_2$ adsorption performance corresponding to 4.39 wt % (about 1 mmol/g), which was the best performance when compared to that of other adsorbents having different molar ratios of Mg/Ti. That is because strong Mg—O—Ti basic sites were formed due to the crystal structure in addition to the large surface area (111.4 m²/g) and pore volume (0.45 cm³/g) thereof. Even other adsorbents having different molar ratios showed lower $CO_2$ adsorption performance when compared to that of $3MgO$—$TiO_2$, it was noted that the numerical values obtained therefrom also showed better than the $CO_2$ adsorption performance of MgO based oxide adsorbents which have been reported in literature until now.

In addition, $3.0MgO$—$TiO_2$ according to example 1 showed better $CO_2$ adsorption performance by twice than an adsorbent manufactured by using an $NH_4OH$ precipitating agent. That is because the adsorbent having a mesoporous structure formed by the self-assembly of a soft template and a metal precursor had a larger surface area, higher exposure of active site, and an ordered mesoporous structure than the adsorbent formed using an $NH_4OH$ precipitating agent.

Meanwhile, both adsorbents of example 1 and example 2 showed better $CO_2$ adsorption performance when performing experiments at 25° C. than at 200° C., and the useful application of the adsorbents in the adsorption field at a low temperature $CO_2$ was confirmed.

From the above-description, it can be understood that the present invention may be implemented in another preferred embodiments without changing the technical spirit or the essential configuration thereof by a person skilled in the art. In this regard, the above-disclosed exemplary embodiments are to be considered illustrative, and not restrictive. The scope of the present invention is to be interpreted to include all changes or modifications derived from the meaning and scope of the following claims and equivalents thereof rather than the foregoing detailed description.

What is claimed is:

1. An adsorbent for capturing carbon dioxide comprising a magnesium oxide/titanium dioxide composite,
    wherein a molar ratio of magnesium/titanium is greater than 2.0 and less than 5.0, and
    wherein the magnesium oxide/titanium dioxide composite has a crystalline phase of $MgO$—$MgTi_2O_4$.

2. The adsorbent for capturing carbon dioxide according to claim 1, wherein the magnesium oxide/titanium dioxide composite has a mesoporous structure.

3. The adsorbent for capturing carbon dioxide according to claim 1, wherein the magnesium oxide/titanium dioxide composite is formed by self-assembly of a metal precursor comprising a magnesium precursor and a titanium precursor with a soft template.

4. The adsorbent for capturing carbon dioxide according to claim 3, wherein the magnesium precursor is magnesium nitrate hexahydrate or magnesium acetate tetrahydrate, and the titanium precursor is titanium isopropoxide or titanium tetrabutoxide.

5. The adsorbent for capturing carbon dioxide according to claim 3, wherein the soft template is diblock copolymer or triblock copolymer.

6. The adsorbent for capturing carbon dioxide according to claim 5, wherein the triblock copolymer is polyethylene glycol-polypropylene glycol-polyethylene glycol or cetrimonium bromide.

7. The adsorbent for capturing carbon dioxide according to claim 1, wherein the molar ratio of magnesium/titanium is from 3.0 to 4.0.

* * * * *